Oct. 17, 1967 E. C. ROSS 3,348,200
CHARACTER READER THAT QUADRANTIZES CHARACTERS
Filed Aug. 13, 1964 3 Sheets-Sheet 1
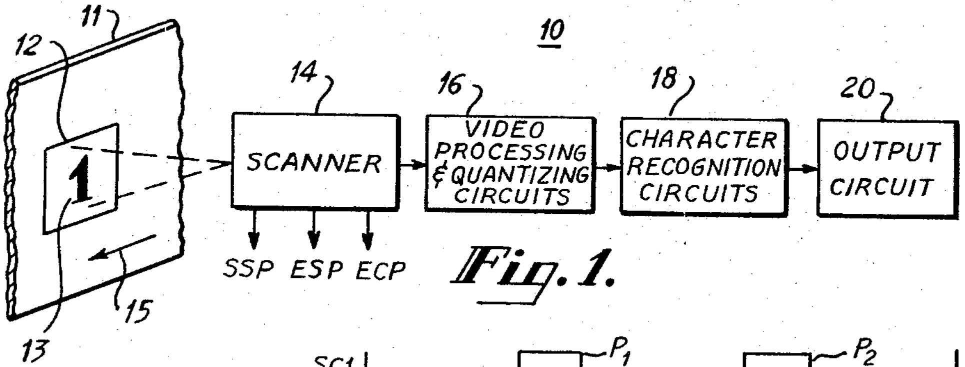
Fig. 1.
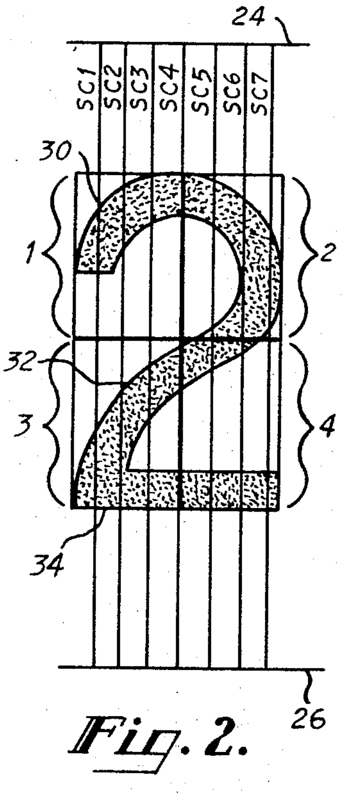
Fig. 2.
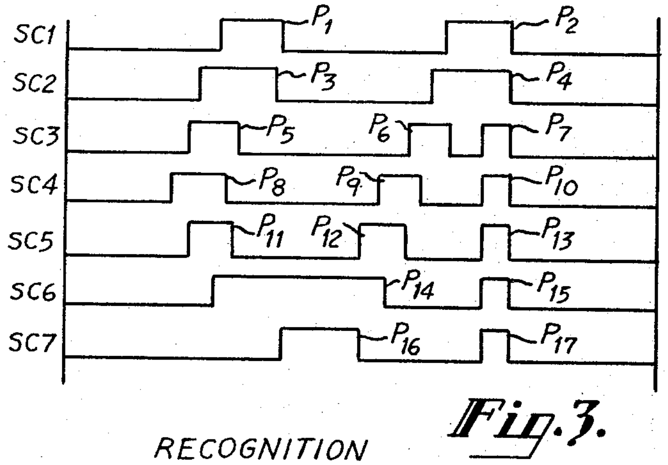
Fig. 3.
RECOGNITION TRUTH TABLE
| | J1 | J2 | J3 | J4 | F1 | F2 | F3 | F4 |
|---|---|---|---|---|---|---|---|---|
| 1 | | − | + | | − | | | |
| 2 | | + | | | − | | + | |
| 3 | | + | | | − | + | − | |
| 4 | | − | − | − | − | | | |
| 5 | | − | | | + | | − | |
| 6 | | − | | | + | | + | |
| 7 | | + | | | − | − | − | |
| 8 | | + | | | + | | + | |
| 9 | | + | | | + | | − | |
| 0 | | − | − | + | − | | | |
Fig. 5.
INVENTOR.
EDWARD C. ROSS
BY John V. Regan
ATTORNEY INVENTOR.
EDWARD C. ROSS
BY John V. Regan
ATTORNEY

CHARACTER READER THAT QUADRANTIZES CHARACTERS

Filed Aug. 13, 1964

3 Sheets-Sheet 3

INVENTOR.
EDWARD C. ROSS
BY John V. Regan
ATTORNEY

United States Patent Office 3,348,200

Patented Oct. 17, 1967

3,348,200

CHARACTER READER THAT QUADRANTIZES CHARACTERS

Edward C. Ross, Trenton, N.J., assignor to Radio Corporation of America, a corporation of Delaware Filed Aug. 13, 1964, Ser. No. 389,343
5 Claims. (Cl. 340—146.3)

This invention relates to character readers, and more particularly to character recognition methods and circuits.

Certain character readers read a document by scanning each character printed on the document by a plurality of successive vertically scan lines to derive serially occurring video signals. Video signals occur whenever the outline trace of a character is intercepted in a scan line and the succession of video signals serially represent the topographical features of the character. The topographical features of a character may include, among other things, the strokes or divisions into which the outline trace of a character is divisible. In alphanumeric (i.e., both alphabetic and numeric) character readers, the number, the position, and the direction of the strokes in the characters as well as how they begin and end are relied upon, in addition to other features, for differentiating one character from another.

In some uses, it is only necessary to read documents containing numerals. Alphanumeric readers used to read numerals do so very reliably because of the large number of feature detection circuits in the reader. These circuits which are designed primarily to read alphabetic characters, are available to differentiate one numeral from another. Accurate recognition of numerals is obtained in such readers but at a relatively high cost.

Accordingly, it is an object of this invention to provide a simple and inexpensive character reader for reading numerals.

It is another object of this invention to provide an inexpensive numeric character reader which reliably reads numerals.

It is a further object of this invention to provide an inexpensive numeric character reader which detects only features which are necessary to reliably distinguish one numeral from another.

A character reader in accordance with the invention reads characters by dividing each character into quadrants and then detects selected reliable features that occur in the quadrants. Recognition is based on the fact that the selected features appear in different quadrants in different characters.

In the drawing:

FIGURE 1 is a overall block diagram of a character reader embodying the invention;

FIGURES 2 and 3 are diagrammatic representations of the scanning of an individual character by the character reader of FIGURE 1;

Figure 4A:
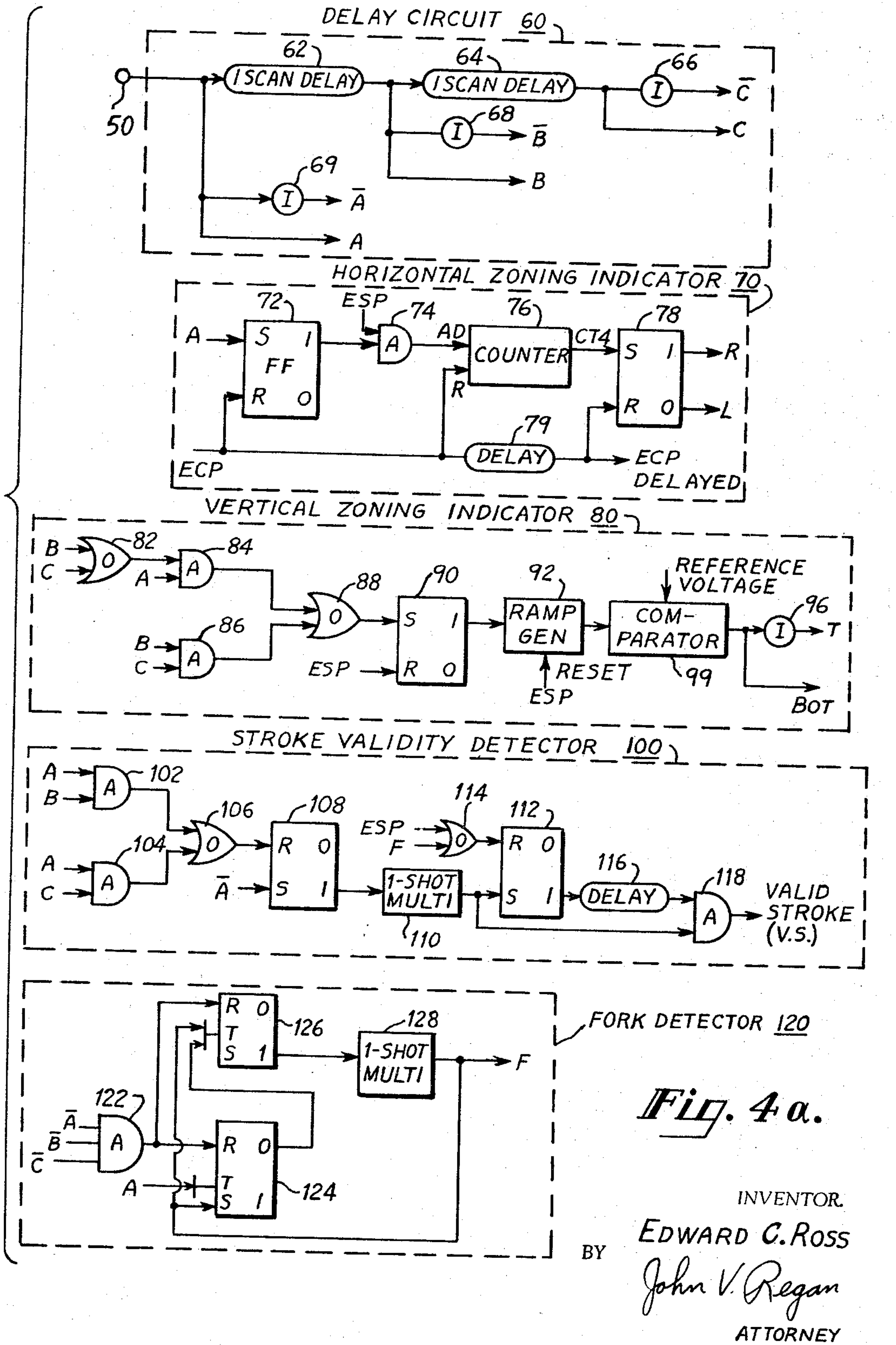
Figure 4B:
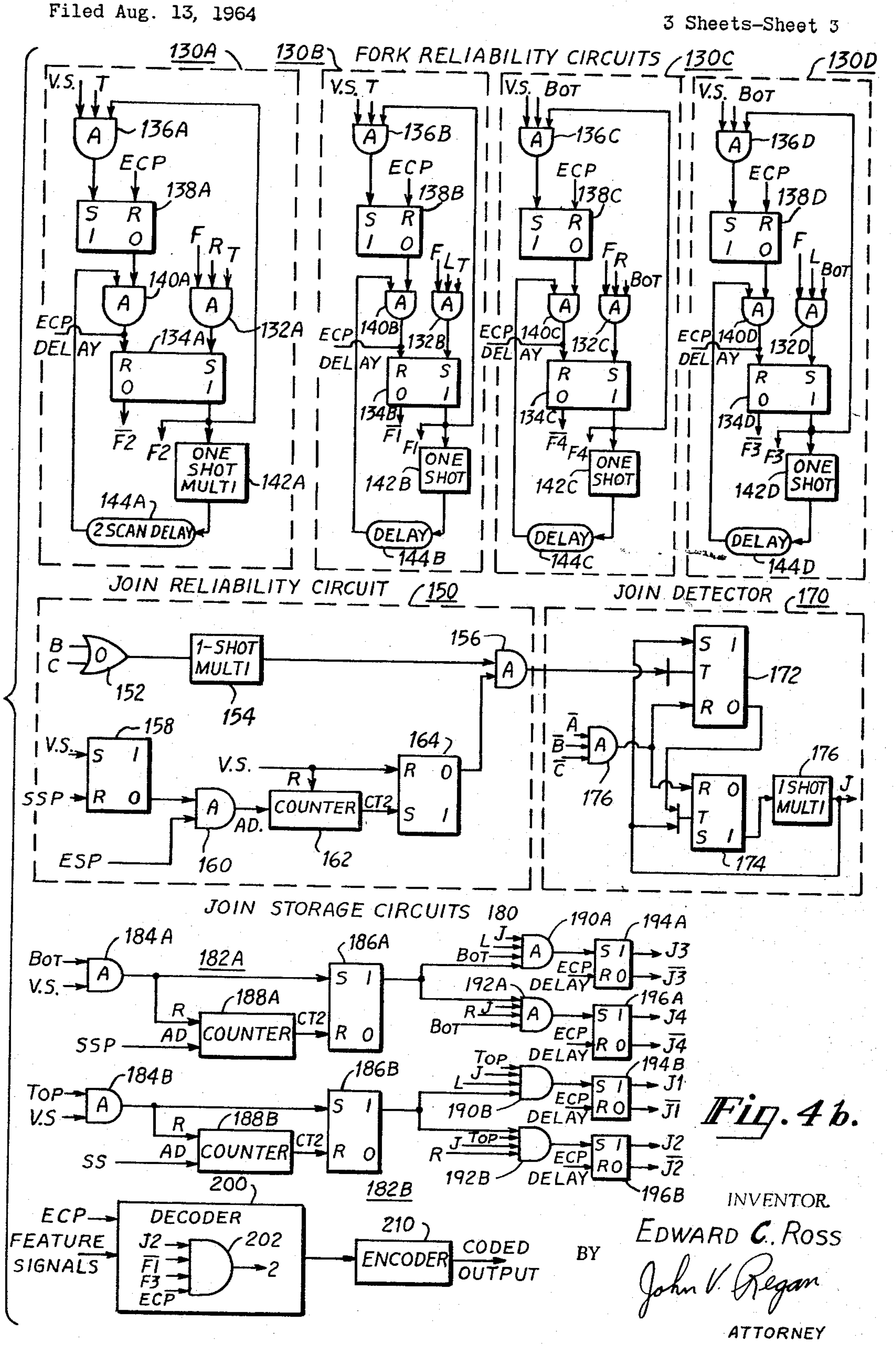

FIGURE 4 comprising FIGURE 4*a* and FIGURE 4*b* is a schematic block diagram of the character recognition circuits utilized in the character reader of FIGURE 1; and FIGURE 5 is one Truth Table utilized in recognizing numerals by the recognition system of FIGURE 4.

Referring now to FIGURE 1, a character reader 10 includes a transport mechanism or document handling device 11 for transporting a document 12 having characters 13 printed thereon. The mechanism 11 positions the document 12 so that the characters 13 are scanned by an electro-optical pickup device or scanner 14. The scanner 14 may comprise an electronic scanning system such as a vidicon camera tube system or alternatively may comprise a mechanical rotating disc scanning system of the Nipkow type. The characters 13 are normally printed on a horizontal line on the document 12 and the characters are scanned successively by a plurality of substantially vertical scan lines which begin at the left of a character and end at the right thereof. The document 12 is moved relative to the scanner 14 at a substantially constant velocity so that successive vertical portions of the character 13 are traversed by successive scans. In FIGURE 1 the transport mechanism is arranged to move the document 12 past the scanner 14 in the direction of the arrow 15.

The output or video signals derived from the scanner 14 are applied to the video processing and quantizing circuit 16 which processes the video signals to provide uniform amplitude pulses having fast rise and fall times. The scanner 14 also generates a start scan pulse SSP, an end scan pulse ESP and an end of character pulse ECP.

The quantized video signals from the quantizer 16 are applied to a character recognition circuit 18 which extracts and stores the desired feature signals. At the end of scanning a character, the character recognition circuit 18 recognizes the various detected feature signals as a particular character and produces a digitalized code representing the character. The coded output of the character recognition circuit 18 is applied to an output circuit 20, for example a digital computer, for further processing.

*Character scanning*

FIGURE 2 shows the manner in which an individual character, the numeral 2, is scanned by the scanner 14. A character is scanned from top to bottom while the document is simultaneously moved from right to left by the transport mechanism 11. Thus, each character is scanned substantially orthogonally and successively by a plurality of substantially vertical scan lines commencing at the left and ending at the right of the character. In FIGURE 2, seven scan lines numbered from 1 to 7 are shown as scanning the character. Other scaning patterns may be utilized. Each of the scan lines commences at a line 24 toward the top of the document 12 and ends at a terminal line 26 toward the bottom of the document.

Video pulses are generated by the scanner 14 during the portions of the scan lines when the outline trace of a character is intercepted because of the contrast between the dark characters and a light document. The video pulses derived from reading the dark characters will be referred to herein as black level or black pulses. The absence of video pulses will be referred to as white level or white pulses. The output signals from the scanner 14 are represented in FIGURES 2 and 3 as a series of lines containing pulses $P_1$, $P_2$, etc., representing the interception of the outline trace of the character. The pulses in FIGURE 3 are shown as quantized pulses after processing by the quantizer 16.

*Character features*

The topographical features of the characters extracted from the quantized video signals by the character recognition circuits 18 comprise the manner in which the strokes of a character begin and end. The outline trace of the numeral 2 in FIG. 2 is considered to be divisible into three strokes. A first or top stroke 30, a second or middle diagonal stroke 32, and a third or bottom stroke 34. A stroke of a character may begin as a completely new stroke or as a fork from a previously existing stroke and may end by itself or end as a join to another stroke. Thus in the numeral 2, the top and middle strokes 30 and 32 begin as new strokes while the bottom stroke 34 begins as a fork from the previously existing middle stroke 32. Additionally, the top 30 and bottom 34 strokes end by themselves while the middle stroke 32 ends as a join to the top stroke 30.

The fact that the strokes 30 and 32 join each other and the strokes 32 and 34 fork away from each other provide easily detectable features that are used by the character reader 10 to differentiate one numeral from another. The join in the numeral 2 occurs in the upper-right portion thereof whereas the fork occurs in the lower-left portion thereof. By detecting the location of the fork and the join in the numeral 2, this numeral is correctly described to differentiate from the other numerals, as will become more apparent subsequently. Thus, the character reader 10 detects both selected features and their position within the character. Therefore, the numerals are divided by the character reader 10 into four zones or quadrants which are numbered 1 through 4 in FIGURE 2. Zones 1 and 2 are top left and right zones respectively whereas zones 3 and 4 are bottom left and right zones respectively.

The above features are extracted from the quantized video signals by the character recognition circuits 18 as will now be briefly described. It is assumed in this description that the seven scans labeled in FIGURE 2 are the only ones that intercept the outline trace of the numeral 2.

The scan SC4 effectively divides the character 2 into left and right portions or zones. Thus a count of the scan lines determines the horizontal location of a feature which is detected. The vertical location of the features may be determined by referencing them to a fixed position such as the line 24 at which a start scan pulse SSP is produced. However, with such an arrangement, characters which are misaligned could be misread. Consequently, the character reader 10 effectively utilizes the top stroke of a character as the starting point from which to measure the top and bottom zones thereof. In the numeral 2, the top stroke 30 is the reference position. Starting at this reference position, the top zone of the character continues until the middle of a nominal character is reached and then the bottom zone of the character begins. Such a division is accomplished by measuring the scan line after the top stroke 30 (i.e., the first black in a scan line) is detected and starting the bottom zone at a predetermined time after the first black is detected. Such an arrangement effectively provides a shifting of the top and bottom zones depending on the curvature of the top stroke. However, when reading numerals only, the variable zones do not interfere with accurate and reliable recognition.

The detection of the forks and the joins will now be described. The scan SC1, as shown in FIGURE 3, intercepts the top stroke 30 to produce a pulse $P_1$ and the middle stroke 32 to produce a pulse $P_2$. Thus, a stroke is effectively defined by the character reader as a black video pulse or a black crossing occurring in the video signal. The scan SC2 produces pulses $P_3$ and $P_4$. The scan line SC3 produces pulses $P_5$, $P_6$ and $P_7$. The present pulses $P_6$ and $P_7$ overlap the pulse $P_4$ in the previous scan SC2. The pulse $P_6$ is produced by the middle stroke 32 of the numeral 2 but the pulse $P_7$ is a newly detected stroke that is the bottom stroke 34. Since the video signal becomes white between the pulses $P_6$ and $P_7$, whereas in the previous scan the corresponding portion of the video signal was a non-interrupted black level, a stroke which begins as a fork away from a previously existing stroke is detected and a fork is recorded as occurring in the numeral 2.

In the scan SC6, the pulse $P_{14}$ occurs during the same portion of the scan line that the two pulses $P_{11}$ and $P_{12}$ occurred in the previous scan line SC5. The present pulse $P_{14}$ overlaps both the pulses $P_{11}$ and $P_{12}$. This indicates to the feature recognition circuits 18 that a stroke ended as a join to another stroke. Therefore, a join is recorded as occurring in the numeral 2.

*Character recognition circuits*

Referring now to FIGURE 4, divided into FIGURES *4a* and *4b*, there is illustrated a schematic block diagram of the character recognition circuits 18. For simplicity, all of the various interconnections between the various blocks are not shown in FIGURE 4 but the leadlines are appropriately labeled. The logic circuits in the character recognition circuit 18 are made up of a plurality of flip-flops, one-shot multivibrators, counters, gates, etc., all of which may be of conventional or known design. The notation used in the drawings for the terminals of the flip-flops is S (set) for the set input terminal, R (reset) for the reset input terminal, "1" for the set output terminal, and "0" for the reset output terminal. The one-shot multivibrators are circuits having an astable state of operation to which they are triggered by an input signal. The multivibrators remain in their astable operating state for a predetermined time interval and produce an output signal during this interval. The multivibrators automatically return to their stable state at the end of the predetermined time interval.

The character recognition circuits 18 include an input video signal terminal 50, FIGURE *4a*, to which are applied quantized video signals derived from the quantizer 16 which ares hown in FIGURE 3. Video signals from the input terminal 50 are applied to a delay circuit. 60. The delay circuit 60 includes a pair of serially connected delay lines 62 and 64, respectively. Each of the delay lines 62 and 64 introduces a delay into the video signals that is exactly equal to one scantime, i.e., the time for scanning one scan line. Thus, a delay of two scan times is introduced into video signals derived from the output of the delay line 64. A twice delayed scan line is termed a C signal. In order to derive a $\overline{C}$ signal, which is the inverse of a C signal, an inverter 66 is coupled to the output of the delay line 64. The inverter 66 provides the $\overline{C}$ signal. A signal which is delayed for one scan time is derived from the output of the delay line 62 and is labeled a B signal. The inverse of a B signal is derived from an inverter 68 which is coupled to the delay line 62. This signal is labeled a $\overline{B}$ signal. A non-delayed signal is derived directly from the input terminal 50 and is labeled in the drawing as an A signal. An inverter 69 is also coupled to the input terminal 50 to derive an $\overline{A}$ signal. Thus, the delay circuit 60 simultaneously provides three successive scans of a character. An A signal is the present scan; a B signal is a once delayed scan; and a C signal is a twice delayed scan.

A horizontal zoning indicator 70 (FIGURE *4a*) is included in the recognition system 18 to divide a numeral being read in to left and right portions or zones. The indicator 70 includes an input flip-flop 72 which is set by an A signal or the first black in a present scan of a character. The flip-flop 72 is reset at the end of scanning a character by an end character pulse, ECP, derived from the scanner 14. The "1" output terminal of the flip-flop 72, as well as an end of scan pulse (ESP) derived from the scanner 14, are coupled to an AND gate 74. The AND gate 74 produces an output at the end of every scan in which black video signals have set the flip-flop 72. Thus, effectively each scan of a character produces an output pulse from the AND gate 74. The output of the AND gate 74 is applied to the advance terminal (AD) of a counter 76. The counter counts each scan of a character. When the counter reaches a count of 4, the count of 4 terminal, CT4, produces an output which is applied to set a flip-flop 78. Thus, at the count of 4 the flip-flop 78 is set producing a right zone signal (R) from the "1" output terminal thereof. The counter 76 is reset to "0" by an end character pulse applied to the reset terminal R thereof. An end character pulse ECP is also applied through a delay line 79 to reset the flip-flop 78 at the end of a character. When the flip-flop 78 is reset, the "0" output terminal thereof produces a left zone (L) signal. This is the initial state of the flip-flop 78 during the first four scans of a character.

A vertical zoning indicator 80 (FIGURE 4*a*) is included in the character recognition circuits 18 to divide a numeral being read into top and bottom zones. The indicator 80 includes an input OR gate 82 to which are applied a B (once delayed) video signal and a C (twice delayed) video signal. The output of the OR gate 82 is coupled to one input of an AND gate 84, the other input of which comprises an A (undelayed) video signal. Thus, the AND gate 84 is activated when there occurs a simultaneous coincidence of black video signals in the present scan of a character and in either one or both of the two previous scans. The indicator 80 also includes another input AND gate which is activated by the coincidence of B and C video signals. Thus, the AND gate 86 is activated when both the previous scans contain black video signals. The outputs of the gates 84 and 86 are coupled through OR gate 88 to the set terminal of a flip-flop 90 which is reset by an end of scan pulse ESP. The "1" output terminal of the flip-flop 90 is coupled to drive positively a ramp generator 92 from an initial starting voltage. The ramp generator 92 is reset to its initial starting voltage at the end of every scan by an ESP pulse. The output of the ramp generator 92 is coupled to a comparator 94. The comparator 94 compares the linearly increasing voltages applied by the ramp generator 92 to a reference voltage applied to the comparator. The reference voltage, which is derived from a source not shown, is selected to be proportional to the time it takes for a scanning beam to travel from the top of an average character to the middle thereof. When the ramp generator 92 output exceeds the reference voltage, the bottom zone of a character is reached and a bottom zone signal BOT is produced by the comparator. An inverter 96 is also coupled to the output of the comparator 94 to invert the previous absence of a signal so as to produce a top zone signal, T.

A stroke validity detector 100 (FIGURE 4*a*) is included in the character recognition system 18 to signal the presence of each valid stroke that occurs in a scan line after the first stroke of the scan line. The detector 100 includes input AND gates 102 and 104. The AND gate 102 is activated by the simultaneous occurrence of black video signals in the present scan A and the once delayed scan B. Similarly, the AND gate 104 is activated by the simultaneous occurrence of black video signals in the present scan A and in the twice delayed signal C. The gates 102 and 104 are coupled through an OR gate 106 to the reset terminal of a flip-flop 108. The flip-flop 108 is set by the occurrence of a $\bar{A}$ signal which is effectively with the trailing edge of a black video signal in the present scan A. The "1" output terminal of the flip-flop 108 is coupled to a one-shot multivibrator 110. The pulse output of the multivibrator 110 is coupled to set a flip-flop 112. The flip-flop 112 is reset by either a fork (F) signal or an end of scan pulse ESP applied through an OR gate 114. The "1" output terminal of the flip-flop 112 is coupled through a delay line 116 to one input of an output AND gate 118. The other input to the gate 118 comprises the output of the one-shot multivibrator 110.

The output of the AND gate 118 comprises a signal labeled valid stroke (VS) which is effectively the detection of each valid stroke in a scan line after the first stroke of the scan line. A valid stroke occurs in a scan line if one of the two previous scans also had a stroke in the same portion of the scan line. The detector 100 therefore effectively tracks the second, third, etc. strokes of a character after the first scan of the character. One purpose of this circuit is to filter out smudges or voids that tend to occur on documents and in characters.

The trailing edge of a present scan signal $\bar{A}$ sets the flip-flop 108 which in turn causes the one-shot multivibrator to set the flip-flop 112. The flip-flop 112 produces a continuous output signal from the "1" output terminal thereof until reset at the end of a scan or by a fork signal. The output signal is delayed by the delay line 116 so that the AND gate 118 is not activated by the first or top stroke of a character. Unless the flip-flop 108 is reset by the activation of the gates 102 and 104, the next trailing edge of a video signal in the present scan, $\bar{A}$, does not produce another output signal from the one-shot multivibrator. However, if the stroke which produces the $\bar{A}$ signal also occurred in one of the two previous scans, the flip-flop 108 is reset and waiting to be triggered by the $\bar{A}$ signal so as to produce an output pulse from the detector 100.

A fork detector 120 (FIGURE 4*a*) is included in the character recognition circuits to detect the forking away of one stroke from another. The detector 120 includes an AND gate 122 which is activated by the simultaneous occurrence of $\bar{A}$, $\bar{B}$ and $\bar{C}$ signals, i.e., white level in three successive scans. The output of the AND gate 122 is coupled to a pair of triggerable flip-flops 124 and 126. The flip-flops are serially connected as a counter. The "0" output terminal of the flip-flop 124 is connected to the trigger input terminal T of the flip-flop 126. A present scan signal A is applied to the trigger input terminal of the flip-flop 124 and an output signal is derived from the "1" output terminal of the flip-flop 126 after two black pulses have been counted in the present scan. The "1" output terminal is coupled to activate a one-shot multivibrator 128 which produces a fork (F) signal. The fork signal F is also coupled back to the set terminal of the flip-flop 124 and the trigger input terminal 126 to reset the flip-flops 124 and 126 to a count of one in case a second, third, etc. fork occurs in a scan line.

The fork detector 120 detects the forking away of a new stroke from a previously existing stroke. When a stroke in a character is intercepted in a scan line, the A signal produced thereby triggers the flip-flop 124 from the reset to the set state. The flip-flops 124 and 126 initially start at the reset state because the initial part of any scan line produces the simultaneous occurrence of $\bar{A}$, $\bar{B}$ and $\bar{C}$ signals to reset these flip-flops. When a fork occurs, there cannot be simultaneous $\bar{A}$, $\bar{B}$ and $\bar{C}$ signals so the flip-flops 124 and 126 are not reset. The next stroke, which is the stroke forking away from a previously existing stroke, causes the flip-flop 124 to trigger to the reset state which produces an output signal to trigger the flip-flop 126 to the set state. The setting of the flip-flop 126 in turn activates the one-shot multivibrator 128 to produce a fork signal (F). The fork F signal produced by the detector 120 may not be a reliable fork since a smudge, dirt spot, or a void in the character produced by a poor printer may have caused a fork to be signaled.

To insure that the fork detected is a true fork, fork reliability circuits 130A, 130B, 130C and 130D (FIGURE 4*b*) are included in the character recognition system 18. There is one fork reliability circuit for each quadrant into which a character is divisible. Thus, the fork reliability circuit 130A is for the right top zone or quadrant 2 of a character. The interconnections for the fork reliability circuits 130A are shown and will be described in detail, but the circuits 130B, 130C and 130D will only be shown. All of the components in the fork reliability circuits 130A–130D are given the same reference numerals since they are identical components but these reference numerals have an A, B, etc. appended thereto to differentiate one circuit from another. Certain inputs to certain flip-flops are different, as is apparent on inspection for reasons which will be clear from a comparison of circuit 130A with the other circuits 130B to 130D.

The fork reliability circuit 130A effectively looks at each fork in quadrant 2 to determine if a valid stroke is generated. The validity of strokes, it will be recalled, is determined by the stroke validity detector 100. The circuit 130A includes an AND gate 132A which is activated by the simultaneous occurrence of a fork signal F, a right zone signal R, and a top zone signal T. Thus, effectively the AND gate 132A is activated by a fork occurring in the quadrant 2 of the character. The output of the AND gate 132A is coupled to set a flip-flop 134A. The "1" output terminal of the flip-flop 134A is fed back to one input of another AND gate 136A. The AND gate 136A also has applied thereto a valid stroke signal VS from the detector 100 (FIGURE 4*a*) as well as a top zone signal T from the vertical zone indicator 80 (FIGURE 4*a*). Thus, the AND gate 136A is activated when a fork is detected in quadrant 2 of a character and a valid stroke is also detected in the top zone of a character. The output of the AND gate 136A is coupled to a set terminal of a flip-flop 138A. The flip-flop 138A is reset by an end character pulse ECP. The "0" output terminal of the flip-flop 138A is coupled to one input terminal of an AND gate 140A. The other input to the AND gate 140A is derived from a delay line 144A which receives a pulse from a one-shot multivibrator 142A and delays the pulse for two scan times. The multivibrator 142A is activated by the setting of the flip-flop 134A.

The detection of a fork in quadrant 2 is signaled by the "1" output terminal of the flip-flop 134A. This fork will be stored in the flip-flop 142A if, during the next two scans of the character, a valid stroke is detected in the top zone of a character. If no valid stroke is detected during the next two scans, the flip-flop 134A is reset to denote that the fork detected was not a valid fork. The flip-flop 134A is also reset at the end of scanning a character by an end character pulse ECP which is delayed. Thus, the fork reliability circuits verify that a fork which has been detected is a valid fork.

A join reliability circuit 150 (FIGURE 4*b*) is included in the character recognition circuits 18 to continuously monitor the strokes in a character to determine if the valid conditions for a join have occurred. Thus, unlike the fork reliability circuit, the join reliability circuit verifies the detection of a join before the join occurs rather than afterwards. This is because the strokes usually end when they join and there is no time left to verify the validity of the join. The join reliability circuit 150 includes an input OR gate 152 to which are applied video signals from the B and C scans of a character. The output of the OR gate is coupled to a one-shot multivibrator 154. The multivibrator 154 therefore is activated on the occurrence of black video signals in either one of the two previous scans. The output of the multivibrator 154 is coupled to one input of an output AND gate 156 which predicts that a valid join can occur. Effectively, the AND gate 156 is activated by black video signals in one of the two previous scans if in addition thereto a valid stroke is also detected in the scans.

The circuit 150 also includes a flip-flop 158 which is set by a valid stroke signal from the detector 100 (FIGURE 4*a*) and reset by a start scan pulse SSP. The "0" output terminal of the flip-flop 158 is coupled to one output of an AND gate 160 and an end of scan pulse ESP is coupled to the other input of this gate. The AND gate 160 is therefore activated at the end of every scan in which a valid stroke has not been detected. The output of the AND gate 160 is coupled to advance a Module 2 counter 162. The count of two terminal of the counter 162 is coupled to the set terminal of a flip-flop 164. The flip-flop 164 as well as the counter 162 are reset by a valid stroke signal. The "0" output from the flip-flop 164 provides the other input to the AND gate 156.

The join reliability circuit 150 produces an output when black video signals occur in one of two preceding scans and a valid stroke is also detected in the present or one of the two preceding scans. Thus, effectively, the circuit 150 is stating that if the prior strokes are valid strokes, then if they merge, the join will be a reliable join. The output of the circuit 150 is coupled to a join detector 170. The join detector 170 includes a pair of serially connected flip-flops 172 and 174. Each of the flip-flops 172 and 174 are reset by an output of the AND gate 176 which is activated by the simultaneous coincidence of $\overline{A}$, $\overline{B}$ and $\overline{C}$ signals. The output of the AND gate 156 in the join reliable circuit 150 is coupled to the trigger input terminal of the flip-flop 172. The flip-flop 172 is serially connected to the flip-flop 174 by connecting the "0" output terminal thereof to the trigger input terminal of the flip-flop 174. The "1" output terminal of the flip-flop 174 is coupled to a one-shot multivibrator 176. The output of the one-shot multivibrator provides a join (J) signal. The join signal is also fed back to the trigger input terminal of the flip-flop 174 as well as to the set terminal of the flip-flop 172 to reset these flip-flops to a count of one to prepare them for a second join occuring in a scan line.

The join detector 170 detects a join which occurs when two valid strokes merge into one. Thus, when the AND gate 156 in the join reliability circuit 150 produces two successive output pulses, denoting that two separate strokes occurred in the previous scan line, the flip-flops 172 and 174 are triggered to produce an output therefrom. This is in the absence of the resetting of these flip-flops by white video signals, i.e., $\overline{A}$, $\overline{B}$ and $\overline{C}$, occurring in the present and two succeeding scan lines White video signals will not occur in all three scan lines if two strokes merge into one in the present scan line. The flip-flop 174 produces the output denoting a join and the join signal (J) is fed back to reset the flip-flops 172 and 174 to a count of one so that another join in the same scan line will generate another join signal.

The join signals which are detected must be detected in the same zone in which a valid stroke is also detected, in order for the join to be recorded in join storage circuits 180. The join storage circuits 180 include a join storage circuit 182A for a join occurring in the bottom zone of a character and a join storage circuit 182B for a join occurring in the top zone of a character. The storage circuit 182A includes an input AND gate 184A which is activated by a valid stroke signal when the bottom portion of a character is being scanned. The output of the AND gate is coupled to set a flip-flop 186A as well as reset a counter 188A. The counter 188A is advanced by a start scan pulse at the start of every scan. The counter 188A comprises a Module 2 counter and the count of two terminal thereof is coupled to reset the flip-flop 186A. The flip-flop 186A requires the occurrence of two scans without a valid stroke on bottom before the resetting thereof. This insures that a void in any character will not reset this flip-flop. The flip-flop 186A is set when a valid stroke occurs in the bottom zone. The "1" output terminal of the flip-flop 186A is coupled to one input terminal of each of AND gates 190A and 192A. The other inputs to the AND gate 190A comprise a join signal, a left zone signal, and a bottom zone signal. Consequently, the AND gate 190A is activated only when a join is detected in quadrant 3 of a character and a valid stroke also occurred in this quadrant. The AND gate 190A is coupled to set a flip-flop 194A which stores a valid join signal. The flip-flop 194A is reset by a delayed end character pulse. A signal from the "0" output terminal of the flip-flop 199A denotes the absence of a join in quadrant 3. Similarly, the flip-flop 196A provides a join J4 and the absence of a join $\overline{J4}$ signal. The join storage circuit 182B contains similar components coupled in a similar manner to the circuit 182A.

At the end of scanning a character, the end character pulse ECP activates a decorder 200 to which are applied the various feature signals detected in the character recognition circuits 18. The decoder may, for example, comprise a plurality of AND gates 202, one of which is shown.

The AND gate 202 signals the detection of the numeral 2 and has as its inputs a join J2 signal (i.e., a join in quadrant 2), a fork 3 signal F3 (i.e., a fork in quadrant 3), and a fork $\overline{F1}$ signal (i.e., the absence of a fork in quadrant 1). The gate 202 is activated by an end character pulse. The decoder 200 includes one AND gate 202 for each of the numerals to be read on a document. The inputs to these gates effectively comprise a physical embodiment of the Truth Table shown in FIGURE 5. The output signal from the decoder 200 is coupled to an encoder 210 wherein the recognized character is encoded into a binary coded form.

*Operation*

In describing the operation of the character reader 10, it will be assumed that the numeral 2 in FIGURE 2 is being scanned by the scanner. In scan SC1, the pulse $P_1$ is the first black detected after scanning the intermargin space occurring before the beginning of the numeral 2. The leading edge of the pulse $P_1$ sets the flip-flop 72 in the horizontal zoning indicator 70 (FIG. 4*a*). The trailing edge of this pulse sets the flip-flop 108 in the stroke validity detector 100 (FIG. 4*a*). The setting of the flip-flop 108 triggers the one-shot multivibrator 110 to set the flip-flop 112. The multivibrator 110 also supplies an enabling input signal to the AND gate 118. However, the delay circuit 116 delays the output signal from the "1" output terminal of the flip-flop 112 for a longer period of time than the duration of the pulse output of the multivibrator 110. Consequently, the AND gate 118 is not activated and the stroke validity detector 100 does not produce a valid stroke (VS) signal on the first stroke detected in a scan line.

The trailing edge of the pulse $P_2$ is also applied to the set terminal of the flip-flop 108 in the detector 100. However, since this is the first scan of the character, there occurred no coincidence of black video signals in the present scan and in the one of the two previous scans. Thus, the gates 102 or 104 are not activated and the flip-flop 108 is not reset. Consequently, there is no transition signal produced by the flip-flop 108 when the pulse $P_2$ is applied to the set terminal thereof and the multivibrator 110 is not triggered into operation. Thus, the first scan of any character does not produce a valid stroke signal. At the end of the scan SC1, the end scan pulse ESP activates the AND gate 74 in the horizontal zoning indicator 70 which advances the counter 76 to a count of one. The first scan of the left zone has therefore been counted.

In the second scan SC2, the pulse $P_3$ is an A or present scan signal and the pulse $P_1$ is a B or one scan time delayed signal. The A and B signals activate the OR gate 82 and the AND gate 84 in the vertical zoning indicator 80 to set the flip-flop 90 and apply a driving signal to the ramp generator 92. The ramp generator 92 is driven positively by this driving signal and the linearly increasing signal is applied to the comparator 94. When the reference voltage is exceeded by the generator 92 signal, the comparator 94 produces an output which signifies that the bottom portion of a character is now being scanned. Previous to the generation of a bottom zone signal by the comparator 94, the inverter 96 produced an output signal which indicated that the top of a character was being scanned. The reference voltage is selected so that the transition from a top to a bottom signal occurs substantially at the center of a normal full height character.

The simultaneous occurrence of the Aand B signals (i.e., the pulses $P_3$ and $P_1$, respectively) activates the AND gate 102 in the stroke validity detector 100 and resets the flip-flop 108. The trailing edge of the pulse $P_3$ produces an $\overline{A}$ signal which sets the flip-flop 108 and triggers the multivibrator 110. The multivibrator 110 in turn sets the flip-flop 112 which applies an enabling signal to the AND gate 118 after an appropriate delay.

The pulse $P_4$ in scan SC2 is an A signal and the pulse $P_2$ in the previous scan is a B signal so that their simultaneous occurrence activates the AND gate 102 to reset the flip-flop 108. The trailing edge of the pulse $P_4$ sets the flip-flop 108 to trigger the multivibrator 110 and activate the AND gate 118. The AND gate 118 therefore produces a valid stroke signal (VS) which denotes that the second stroke in the scan line has been detected and that it is a valid stroke. It is to be noted that to signal a valid stroke, two strokes must be detected in two scan lines. Thus the detector 100 effectively calls both strokes valid strokes even though only one valid stroke signal is generated. The end of scan pulse ESP which occurs at the end of the scan SC2 advances the counter 76 in the horizontal zoning indicator 70 to a count of two. This pulse also resets the flip-flop 90 in the ramp generator 92 in the zoning indicator 80 as well as the flip-flop 112 in the detector 100.

In the third scan line SC3, the pulse $P_5$ comprises an A signal. The once delayed pulse $P_3$ comprises a B signal. The twice delayed pulse $P_1$ comprises a C signal. The simultaneous occurrence of these three signals resets the flip-flop 108 to cause it to be in a condition to be set by the trailing edge of the pulse $P_5$. Thus, the AND gate 118 has an enabling signal applied thereto. At the trailing edge of the twice delayed pulse $P_1$ there occurs simultaneously $\overline{A}$, $\overline{B}$ and $\overline{C}$ signals which activate the AND gate 122 in the fork detector 120 to reset the flip-flops 124 and 126. The leading edge of the pulse $P_6$ in the scan SC3 triggers the flip-flop 124 in the fork detector to the set state. The trailing edge of this pulse $P_6$ produces a valid stroke signal (VS) from the detector 100. The B signal in this portion of the scan line (i.e., $P_4$) prevents the AND gate 122 from being activated and consequently the intervening white between the pulses $P_6$ and $P_7$ causes a new leading edge A signal, i.e., the pulse $P_7$, to trigger the flip-flop 124 in the fork detector 120 from the set to the reset state. The flip-flop 124 in switching to the reset state triggers the flip-flop 126 to the set state which fires the one-shot multivibrator 128. The multivibrator produces a fork signal F which is applied to the AND gate 132D in the fork reliable circuit 130D in FIGURE 4*b*. This AND gate is activated because the horizontal zoning indicator is producing a left signal L from the "0" output terminal of the flip-flop 78 and the vertical zoning indicator 80 is producing a bottom zone signal from the comparator 94. Thus, the AND gate 132D is activated to set the flip-flop 134D. The flip-flop 134D applies an enabling signal to the AND gate 136D and activates the one-shot multivibrator 143D. The pulse output of the multivibrator 142D is delayed by the delay line 144D for two scans. If, during the two scan period, a valid stroke signal does not activate the AND gate 136D to set the flip-flop 138D and thereby disable the AND gate 140D, the fork signal will be removed from the flip-flop 134D.

The fork signal F is also applied to reset the flip-flop 112 in the stroke validity detector 100. The resetting of this flip-flop prevents the trailing edge of the pulse $P_7$ from generating a valid stroke signal.

In the scan SC4, the pulse $P_8$ enables the AND gate 118 in the detector 100 and the trailing edge of the pulse $P_9$ activates this gate to produce a valid stroke signal in the bottom zone of the character. Consequently, the AND gate 136D in the fork reliable circuit 130D (FIGURE 4*b*) is activated to set the flip-flop 138D. The setting of the flip-flop 138D removes the enabling signal applied to the AND gate 140D from the "0" output terminal thereof. Therefore, the two-scan delay pulse is prevented from resetting the flip-flop 134D and removing the fork signal which is stored therein. Thus, a fork 3 signal is recorded in the flip-flop 134D for the numeral 2. The end of scan pulse produced at the end of the scan SC4 advances the counter 76 in the horizontal zoning indicator 70 to the count of 4. The counter 76 therefore produces an output which sets the flip-flop 78 and produces a right zone signal.

In the scan SC5, the pulse $P_{11}$ enables the AND gate 118 in the stroke validity detector 100 and the pulses $P_{12}$ and $P_{13}$ produce valid stroke signals therefrom. The pulse $P_{11}$ in conjunction with the pulse $P_8$ also causes the ramp generator 92 to produce an output voltage. This output voltage exceeds the reference voltage only after the pulse $P_{12}$ terminates. Thus the pulse $P_{12}$ occurs in quadrant 2 because the top stroke 30 curves in this quadrant. Therefore the valid stroke signal for the pulse $P_{12}$ occurs in the top zone and resets the counter 188B in the join storage circuits 180 as well as sets the flip-flop 186B in this circuit. Consequently, enabling signals are applied to AND gates 190B and 192B which signal, respectively, a join in the left and right top zones of a character. The valid stroke signals also set the flip-flops 158 and 164 as well as the counter 162 in the join reliability circuit 150. Consequently, an enabling signal is applied to the AND gate 156 in this circuit.

At the scan SC6, the leading edge of the pulse $P_8$ (i.e., the C signal in this scan) activates the gate 152 to fire the one-shot multivibrator 154. The AND gate 156 is therefore activated to trigger the flip-flop 172 in the join detector 170 to the set state. The absence of intervening white due to the pulse $P_{14}$ prevents the AND gate 176 from being activated. Therefore, the leading edge of the pulse $P_{12}$ which is a B signal activates the one-shot multivibrator 154 and the AND gate 156 to produce a second output from the join reliability circuit 150. This pulse output triggers the flip-flop 172 in the join detector 170 to the reset state which in turn triggers the flip-flop 174 to the set state. The transition of the flip-flop 174 to the set state activates the mulivibrator 176. The multivibrator 176 produces a join signal (J). The join signal is also fed back to set the flip-flops 172 and 174 to a count of one in preparation for a second join in the same scan. The join signal activates the AND gate 192B in the join storage circuit 182B. The activation of this gate sets the flip-flop 196B which produces a join in quadrant 2 for the numeral 2.

Thus, a fork has been recorded as occurring in the lower-left quadrant or quadrant 3 (F3) for the numeral 2 and a join as occurring in the upper-right portion or quadrant 2 of this character. All of the necessary feature signals for distinguishing the numeral 2 from the other numerals have been recorded since no fork occurred in quadrant 1 (i.e., $\overline{\text{F1}}$). The scan after SC7 is a totally blank scan and the scanner 14 produces an end character pulse (ECP). The end character pulse (ECP) applies an enabling signal to the AND gates 202 in the decoder 200. The AND gate 202 for the numeral 2 is activated because of the feature signals applied thereto. The gate 202 produces an output signal which is encoded in the encoder 210 to provide a binary coded output denoting that the numeral 2 has been scanned. The other feature signals for detecting the other numerals in a manifold 10 IBM typewriter font is shown in the Truth Table of FIGURE 5.

A character reader is described which quadrantizes a character and then detects selected features in these quadrants. The features comprise the presence and absence of forks and joins in these quadrants. Because few features are detected the character reader is relatively inexpensive and is reliable for reading numeric characters.

What is claimed is:

1. In a character reader for reading characters from a document, different ones of said characters being formed of different outline traces, the outline traces of said characters including a plurality of topographical features including strokes, comprising the combination of:

means for scanning a character by a plurality of vertical scan lines to produce video signals serially representing the features of said character, means for causing said scanning means to successively divide each of said characters into quadrants, first and second delay lines, each exhibiting a delay of one scan time, for delaying the video signals on each scan line, means for comparing delayed and undelayed scan lines to generate a valid stroke signal when valid strokes are detected in said scanlines, means for detecting when a stroke forks into two strokes, means for recording the quadrant in which said fork is detected only when a valid stroke signal is generated in the same quadrant within two scan times after said fork is detected, means for detecting a pair of strokes joined into one stroke only when a valid stroke signal has been generated for said strokes, and means for recording the quadrant in which said join is detected only when a valid stroke occurs in the same quadrant.

2. In a character reader for reading characters from a document, said characters being formed of a plurality of topographical features including strokes, the combination comprising, scanning means for scanning said characters on said document by a plurality of scanlines to produce video pulses whenever the strokes of a character are scanned, means coupled to cause said scanning means to successively divide each of said characters into quadrants, means coupled to said scanning means for generating a coincident pulse signal in a scanline whenever a video pulse is detected in said scanline coincident with a video pulse in one of the immediately preceding scanlines, and means for generating a valid stroke signal upon the generation of said coincidence pulse signal.

3. A character reader in accordance with claim 2, that further includes, a fork detector coupled to said scanning means to detect the scanline in a quadrant wherein a stroke forks into two strokes, and means for recording said fork as a valid fork whenever a valid stroke is detected in the same quadrant in scanlines that immediately succeed said fork detection.

4. A character reader in accordance with claim 2, that further includes, storage means for storing valid stroke signals, a join detector coupled to said scanning means for detecting the joining of two strokes into one stroke whenever a valid stroke signal is stored in the scanlines that immediately precede said join detection, and means for recording said join as a valid join whenever said valid stroke signal occurs in the same quadrant as said join detection.

5. In a character reader for reading characters, said characters being formed of one or more distinctive features including strokes, said character reader including a scanner for scanning said characters, the combination comprising, means coupled to said scanner for detecting strokes in a character, quadrantizing means coupled to said scanner for effectively dividing said character into quadrants, generating means for generating valid stroke signals upon the redetections of strokes in said character, a join detector for generating, in response to said valid stroke signals, join signals when strokes join together in said character, a fork detector for generating, in response to said valid stroke signals, fork signals when strokes fork away from each other in said character, and identification means coupled to said quadrantizing means and said fork and join detectors for identifying said character based on the presence or absence of only said forks and joins in said quadrants of said character.

References Cited

UNITED STATES PATENTS

| | | | |
|---|---|---|---|
| 3,193,799 | 7/1965 | Holt | 340—146.3 |
| 3,142,818 | 7/1964 | Holt | 340—146.3 |
| 3,178,687 | 4/1965 | Perotto | 340—146.3 |
| 3,058,093 | 10/1962 | Vernon et al. | 340—146.3 |
| 2,963,220 | 12/1960 | Kosten et al. | 340—146.3 |
| 3,199,080 | 8/1965 | Rabinow et al. | 340—146.3 |
| 2,889,535 | 6/1959 | Rochester et al. | 340—146.3 |
| 3,074,050 | 1/1963 | Schultz | 340—146.3 |
| 3,178,688 | 4/1965 | Hill et al. | 340—146.3 |

MAYNARD R. WILBUR, *Primary Examiner.*

J. I. SCHNEIDER, *Assistant Examiner.*